United States
Zhukov et al.

[11] 3,926,039
[45] Dec. 16, 1975

[54] PULSED ULTRASONIC FLAW DETECTOR

[76] Inventors: Oleg Nikolaevich Zhukov, Sovkhoz Krasny Mayak, 7, kv. 4; Moisei Davidovich Medvinsky, Pushkinskaya ulitsa, 9, kv. 58; Vladimir Izidorovich Ryk, pereulok Axakova, 18, kv. 14, all of Moscow, U.S.S.R.

[22] Filed: June 7, 1973

[21] Appl. No.: 367,874

[52] U.S. Cl. .................................................. 73/67.7
[51] Int. Cl.² ......................................... G01N 29/04
[58] Field of Search............ 73/67.7, 67.8 R, 67.8 S, 73/67.9

[56] References Cited
UNITED STATES PATENTS
3,690,153  9/1972  Matay.............................. 73/67.8 R FOREIGN PATENTS OR APPLICATIONS
1,546,786  9/1968  France................................. 73/67.8

*Primary Examiner*—Richard C. Queisser
*Assistant Examiner*—John P. Beauchamp
*Attorney, Agent, or Firm*—Haseltine, Lake & Waters

[57] ABSTRACT

The present invention relates to a Pulsed ultrasonic flaw detector designed to determine the location, size and character of internal defects in materials. An operational amplifier of the flaw detector includes a current generator circuit coupled to a capacitor that forms a control signal. The current generator has a controlled internal resistance and employs AC positive feedback provided by one of the amplifier stages of an operational amplifier. The output stage of the operational amplifier is coupled to the amplifier of the reflected signal receiver via an AC negative feedback circuit employed in one or several stages of this amplifier.

6 Claims, 2 Drawing Figures

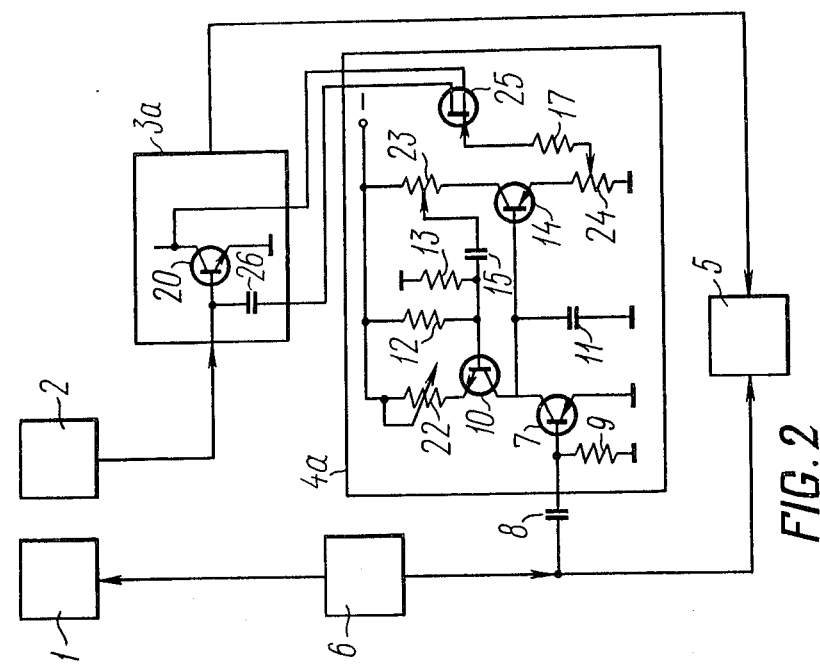
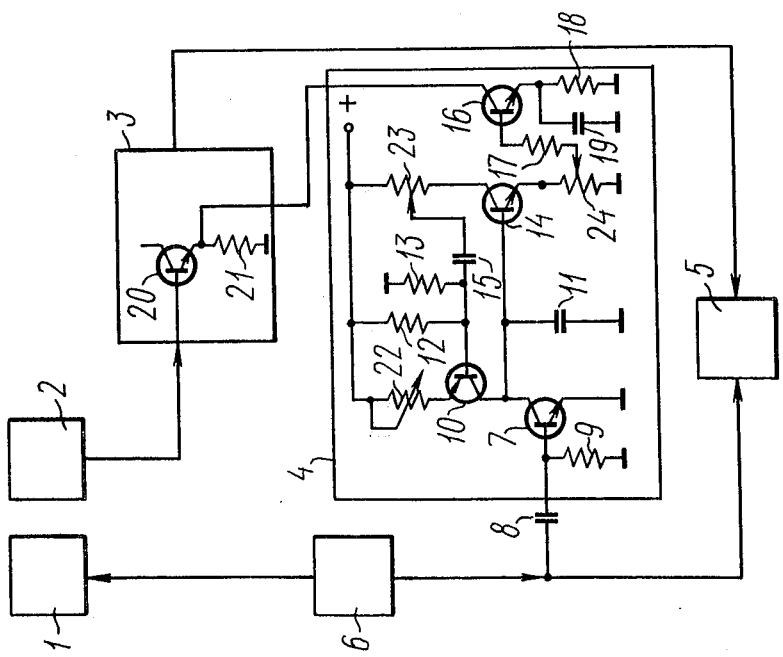

PULSED ULTRASONIC FLAW DETECTOR

The present invention relates to a pulsed ultrasonic flaw detector designed to determine the location, size and character of internal defects in materials, such as cavities, slag inclusions, cracks, porosity, etc., occurring at different depths.

While the depth of a specific defect is determined directly by the time elapsed between the instant a signal or pulse is sent and the instant an echo signal is received, the size of this defect is inferred indirectly, judging by the amplitude of the reflected pulse.

However, owing to the dispersion and damping of ultrasonic oscillations in the material under test, the amplitude of the reflected pulse depends not only on the size and orientation of the reflecting surface of the defect, but also on the depth at which it occurs.

The variation of the reflected signal intensity follows the relationship $$u = \frac{e^{-\alpha t}}{t^m}, \quad (1)$$

where
- $u$ is the reflected signal amplitude,
- $e$ is the base of natural logarithms,
- $\alpha$ is a coefficient of damping of the ultrasonic oscillations in the material,
- $t$ is the time period from the instant of radiation to the instant of reception of the reflected signal, and
- $m$ is a coefficient depending on the size and shape of the defect, varying from 1 to 2.

If the defect is infinite in size, the coefficient $m$ is equal to unity, and should the defect have a size compatible with or smaller than that of the piezoelectric plate of the flaw detector received, this coefficient will be equal to 2.

It is obvious from the foregoing that by varying in time the gain of the reflected signal inversely to the relationship (1), it is possible to obviate the effect of the depth, at which the defect occurs, on the readings of the flaw detector.

Attempts have been made to employ an operational amplifier to provide for the variation of the echo signal gain in time according to the following law:

$$u_1 = k_1 e^{\alpha t} \cdot t^2, \quad (2)$$

where, as distinct from the relationship (1),
- $u_1$ is the output voltage of the operational amplifier, and
- $k_1$ is a proportionality factor.

The output voltage is formed across a capacitor or a plurality of capacitors in one stage or a plurality of stages of the operational amplifier with the help of an AC positive feedback circuit of constant gain.

It follows from the foregoing that the time ($t$) is such that in both relationships (1) and (2) the operational amplifier can give satisfactory results only for relatively small-size defects.

Besides, the known compensation method is only effective where the gain of each amplifier stage of the flaw detector amplifier is in linear relationship with the magnitude of its input voltage. However, the linear portion of the amplitude characteristic of each of the employed amplifier stages is very limited, which adversely affects the dynamic range of the receiving circuit of the flaw detector.

The principal object of the invention is to provide a pulsed ultrasonic flaw detector employing a modified version of an operational amplifier connected to a receiver amplifier so as to compensate for depth effect, for both large and relatively small defects on the amplitude of the reflected signals.

This object is attained by an operational amplifier comprising, according to the invention, a current generator circuit having a controlled internal resistance and employing an AC positive feedback circuit whose function is performed by one of the amplifier stages. The generator circuit is designed to charge a capacitor which forms a control signal applied to an amplifier stage of the operational amplifier, an output stage thereof being connected to the receiver amplifier via an AC feedback applied to the amplifier stage, made negative so as to have a controlled magnitude.

The output stage of the operational amplifier forms a voltage which controls the gain of the receiver amplifier according to the expression:

$$u = k \cdot e^{\alpha t} \cdot t^m, \quad (3)$$

where all the designations are the same as in the relationships (1) given above. The coefficient $m$ may vary from 1 to 2 depending on the size of the defects to which the flaw detector is adjusted.

In a preferred, exemplary embodiment of this invention, the current generator circuit and the amplifier stage of the operational amplifier, serving as the AC positive feedback circuit, should be preferably built around transistors, the collector of the transistor employed in the current generator and the base of the transistor employed in the amplifier stage being preferably connected to the capacitor which forms the control signal. Such a flaw detector is considerably simplified in its manufacture, adjustment and operation.

The emitter circuit of the transistor employed in the current generator should preferably incorporate an adjustable resistor to control the internal resistance of the current generator circuit.

It is no less preferable that the collector circuit of the transistor used in the amplifier stage of the operational amplifier should incorporate a potentiometer to control the AC positive feedback applied to the current generator circuit.

In order to preserve the advantage inherent in semiconductor instrumentation, the output stage of the operational amplifier and the amplifier stage of the receiver is preferably built around transistors, with the AC negative feedback applied to the amplifier stage of the receiver being furnished by a resistor which serves as a load in the emitter circuit of the transistor of the receiver amplifier stage, while the collector of the transistor of the output stage is preferably connected in parallel with said resistor, and the emitter of the transistor is preferably connected to an auxiliary capacitor. The base of the output stage transistor may be coupled to the amplifier stage of the operational amplifier via a potentiometer, which arrangement permits of controlling the AC negative feedback applied to the amplifier stage of the receiver.

The output stage of the operational amplifier may use a field-effect transistor, thereby improving the characteristics of the flaw detector somewhat though slightly raising the cost of the instrument.

In this case, the negative feedback circuit employed in the receiver amplifier stage may incorporate a capacitor via which the base of the transistor used in the receiver amplifier is preferably connected to the source of the field-effect transistor, the drain of the latter being connected to the collector of the transistor, and the gate thereof to the amplifier stage of the operational amplifier via a potentiometer to control the AC negative feedback.

The present invention offers a material advantage of enabling defects to be evaluated for size irrespective of the depth at which they occur.

Two specific embodiments of the present invention will now be described, by way of example, with reference to the accompanying drawings, wherein:

FIG. 1 is a circuit diagram of an exemplary embodiment of a flaw detector, in accordance with the invention and;

FIG. 2 is a circuit diagram of a modified embodiment of the flaw detector.

The pulsed ultrasonic flaw detector of this invention comprises a pulsed ultrasonic oscillator 1 (FIG. 1) which generates short ultrasonic pulses emitted in a beam and penetrating the material under test (not shown). On encountering a defect, the pulses are reflected back to a receiver 2 and thence to an amplifier 3. The gain of the amplifier 3 is varied in time by control pulses shaped by an operational amplifier 4.

The pulses received by the receiver 2 are amplified by the amplifier 3 and applied to an indicator 5 which comprises a cathode-ray tube (not shown). A synchronizer 6 controls the operation of the pulsed ultrasonic oscillator 1, the operational amplifier 4 and the indicator 5.

The operational amplifier 4 incorporates a transistor 7 whereof the base is coupled to the synchronizer 6 via a differentiating RC circuit element composed of a capacitor 8 and a resistor 9. The collector of the transistor 7 is coupled to the collector of a transistor 10, employed in a current generator circuit.

The collectors of the transistors 7 and 10 are coupled to a capacitor 11 charged from the current generator circuit. The pulse formed by the capacitor 11 serves as a control pulse or signal for the amplifier 3, as will be explained hereinbelow. The transistor 7 functions as a gating circuit to quickly discharge the capacitor 11 at the instant of arrival of a timing signal from the synchronizer 6.

Resistors 12 and 13 coupled to the base of the transistor 10 form a voltage divider to supply the required bias voltage to the base of the transistor 10.

The base of the transistor 10 is also coupled via a capacitor 15 to the collector circuit of a transistor 14 employed in an amplifier stage of the operational amplifier 4, that stage functioning as an AC positive feedback circuit employed in the current generator circuit.

The shaped and amplified control pulse is sent from the emitter lead of the transistor 14 to the base of a transistor 16 used in the output stage of the operational amplifier 4, that stage furnishing the required bias current for the transistor 16 via a resistor 17. A resistor 18 serving as a load and a capacitor 19 are included in the emitter circuit of the transistor 16.

The amplifier 3 of the receiver 2 uses a transistor 20 and incorporates a resistor 21 serving as a load in the emitter circuit of the transistor 20 and furnishing the negative feedback employed in the amplifier 3. The transistor 16 and the capacitor 19, the latter forming the reactive component of the AC negative feedback circuit, are coupled in parallel with the resistor 21 by the way of ground.

The resistance of the resistor 18 is 10 to 100 times that of the resistor 21, thereby ensuring that, with the transistor 16 in a fully conducting state, the direct current through the amplifier 3 which uses transistor 20, remains stable.

In the initial state of the circuit, the transistor 7 is non-conducting, the capacitor 11 is fully charged. The transistors 14 and 16 are conducting. The resistor 21 is AC shunted by the conducting low-resistance transistor 16 and by the capacitor 19, the negative feedback being the lowest, while the gain of the amplifier 3 is maximum.

As a square pulse from the synchronizer 6 is applied to the base of the transistor 7, which happens simultaneously with the emission of a short ultrasonic pulse by the oscillator 1, the transistor 7 is rendered conducting. The capacitor 11 is instantaneously discharged and the transistors 14 and 16 are simultaneously cut off. The resistor 21 being no longer shunted by the transistor 16 and the capacitor 19, the gain of the amplifier 3 sharply drops due to an increase in the degeneration factor.

Next, the capacitor 11 starts to be gradually charged, causing the potential across the base of the transistor 14 to increase, and this transistor gradually becomes conducting. The transistor 16 likewise gradually becomes conducting with the result that its resistance diminishes, hence causing the degeneration factor in the amplifier 3 to vary. These processes proceed until the capacitor 11 is fully charged.

When the synchronizer 6 sends the next square pulse, the aforedescribed process is repeated.

Owing to the AC positive feedback applied to the current generator circuit of the operational amplifier and the AC negative feedback applied to the amplifier 3, the reflected signals are so amplified that the depth at which the defects occur does not affect the amplitude of the signals (the amplification obeys the earlier mathematical expressions (3)).

By varying the current generator duty and the AC positive feedback factor in the feedback circuit of the latter, it is possible to vary respectively the duration and the pulse rise time of the control pulse formed by the capacitor 11. To this end, the operational amplifier 4, in accordance with the invention, incorporates an adjustable resistor 22 included in the emitter circuit of the transistor 10 and a potentiometer 23 included in the collector circuit of the transistor 14 employed in the amplifier stage of the operational amplifier 4.

By varying the resistance of the resistor 22, the operating condition of the transistor 10 is varied, causing a variation in the charging time of the capacitor 11, that is to say the duration of the control pulse formed by this capacitor.

A change in the position of the cursor of the potentiometer 23 brings about a variation in the AC positive feedback factor in the current generator circuit, causing the pulse rise time of the control pulse to vary that is formed by the capacitor 11.

In order to control the magnitude of the AC negative feedback applied to the amplifier 3, the coupling circuit in the amplifier stage of the operational amplifier 4 and its output stage incorporate a potentiometer 24 that is included in the emitter circuit of the transistor 14 to adjust the magnitude of the signal applied to the transistor 16 of that output stage. A potentiometer 24, included in the emitter circuit of the transistor 14, may be used to vary the amount of gain control of the amplifier 3.

The current generator, embraced by a positive feedback through the amplifier stage based on the transistor 14, allows the wiper or slide of the potentiometer 24 to produce a voltage that changes according to a law close to the one described by the formula $u_1 = k_1 e^{\alpha t} t^m$. Movement of this wiper causes a change in the proportional factor $k$, and movement of the wiper of the potentiometer 23 allows changes in the ultrasound attenuation factor $\alpha$ to be compensated. The adjustable resistor 22, also constituting a potentiometer, helps to select the required value of the coefficient $m$ depending on the shape of the flaws.

The characteristics of the inventive detector may be improved somewhat by building the output stage of an operational amplifier 4a (FIG. 2), taking the place of the operational amplifier 4, around a field-effect transistor 25.

In this modified embodiment of the invention, most of the circuit elements are identical with and connected similar to those of the described main embodiment. A receiver amplifier 3a takes the place of unit 3 in FIG. 1. The gate of the field-effect transistor 25 is coupled to the cursor of the potentiometer 24. The collector of the transistor 20 is now coupled to the drain, while the base of the same transistor is coupled to the source of the field-effect transistor 25 via a capacitor 26, the latter furnishing an AC negative feedback applied to the amplifier 3a. Of the receiver 2 the field-effect transistor permits of varying the resistance of the AC negative feedback circuit.

According to the invention, the output stage of the operational amplifier 4 or 4a may be coupled to all or some of the stages of the amplifier 3 or 3a (the drawings illustrate only one stage in the amplifiers).

What is claimed is:

1. A pulsed ultrasonic flaw detector for testing materials, comprising an ultrasonic oscillator; a receiver for signals reflected from the internal defects in the material under test; a first amplifier for said receiver, including at least one stage for amplifying the signals introduced from said receiver; an AC negative feedback circuit in said one amplifier stage; an operational amplifier having therein a current generator circuit and at least two stages, including an output stage; said operational amplifier being connected to said first amplifier via said negative feedback circuit; said generator circuit having a controllable internal resistance and having applied thereto AC positive feedback furnished by one of said stages of said operational amplifier; in the latter, a capacitor coupled to said generator circuit and to said one stage thereof, said capacitor forming a signal to control said first amplifier, thereby compensating for the effect of the depth, at which the defects occur, on the amplitude of the signals reflected therefrom; an indicator connected to said first amplifier; a synchronizer connected to said oscillator, to said operational amplifier and to said indicator, in controlling relation thereto; and means for quickly discharging said capacitor which forms the control signal.

2. The ultrasonic flaw detector as defined in claim 1, wherein said current generator circuit and said one stage in said operational amplifier include transistors; the collector of one of said transistors, in said generator circuit, and the base of another one of said transistors, in said one operational amplifier stage, being connected to said capacitor which forms the control signal.

3. The ultrasonic flaw detector as defined in claim 2, further comprising an adjustable resistor included in the emitter circuit of said one transistor, allowing to control the internal resistance of said current generator circuit.

4. The ultrasonic flaw detector as defined in claim 2, further comprising a potentiometer included in the collector circuit of said other transistor, allowing to control the positive feedback applied to said current generator circuit.

5. The ultrasonic flaw detector as defined in claim 1, wherein said output stage of the operational amplifier and said one stage of the amplifier include transistors; a resistor included in said negative feedback circuit, serving as a load in the emitter circuit of one of said transistors, in said one stage of the amplifier; the collector of another one of said transistors, in said output stage, being connected in parallel with said resistor; and another capacitor connected to the emitter of said other transistor; a potentiometer which connects the base of said other transistor to control said negative feedback circuit.

6. The ultrasonic flaw detector as defined in claim 1, wherein said one amplifier stage includes a first transistor; said output stage includes a field-effect transistor; further comprising another capacitor included in said negative feedback circuit; the base of said first transistor being connected to the source of said field-effect transistor via said other capacitor; the drain of said field-effect transistor being coupled to the collector of said first transistor; and a potentiometer connecting the gate of said field-effect transistor to said one operational amplifier stage, to control said negative feedback circuit.

* * * * *